US007626917B2

(12) United States Patent
Lin et al.

(10) Patent No.: US 7,626,917 B2
(45) Date of Patent: Dec. 1, 2009

(54) METHODS AND APPARATUS FOR COST MINIMIZATION OF MULTI-TIERED INFRASTRUCTURE WITH END-TO-END DELAY GUARANTEES

(75) Inventors: Wuqin Lin, Marietta, GA (US); Zhen Liu, Tarrytown, NY (US); Cathy Honghui Xia, Croton-on-Hudson, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 10/865,064

(22) Filed: Jun. 10, 2004

(65) Prior Publication Data

US 2005/0278690 A1    Dec. 15, 2005

(51) Int. Cl.
*H04J 11/00* (2006.01)
*G06F 9/44* (2006.01)
*G06F 9/45* (2006.01)

(52) U.S. Cl. .................... 370/203; 717/104; 717/151
(58) Field of Classification Search ................ 709/226; 718/104
See application file for complete search history.

(56) References Cited

U.S. PATENT DOCUMENTS 4,256,925 A * 3/1981 Goode .................... 370/322
6,144,639 A * 11/2000 Zhao et al. ............... 370/235

FOREIGN PATENT DOCUMENTS

EP          0364090    * 4/1990

OTHER PUBLICATIONS

Z. Liu et al., "On Maximizing Service-Level-Agreement Profits," Proceedings of the 3rd ACM Conference on Electronic Commerce, pp. 213-223, Oct. 14-17, 2001.
Stefan M. Stefanov, "Convex Separable Minimization Subject to Bounded Variables," Computational Optimization and Applications, vol. 18, No. 1, pp. 27-48, Jan. 2001.
M.S. Kodialam et al., "Algorithms for Separable Nonlinear Resource Allocation Problems," Operations Research, vol. 46, No. 2, pp. 272-284, Mar.-Apr. 1998.
C.G. Kang et al., "Combined Channel Allocation and Routing Algorithms in Packet Switched Networks," Computer Communications, Elsevier Science, vol. 20, No. 13, pp. 1175-1190, Nov. 25, 1997.

(Continued)

*Primary Examiner*—Ayaz R Sheikh
*Assistant Examiner*—Blanche Wong
(74) *Attorney, Agent, or Firm*—Kenneth R. Corsello; Ryan, Mason & Lewis, LLP

(57) ABSTRACT

Techniques are provided for determining a capacity allocation in a multi-tiered computing system. In one aspect of the invention, a technique for designing capacity allocation for a multi-tiered computing system, each tier of the computing system having one or more computing devices (e.g., servers), comprises the following steps/operations. Input parameters relating to capacity allocation are obtained. A capacity allocation is computed based on at least a portion of the input parameters, the capacity allocation being computable such that one or more end-to-end performance measures are substantially satisfied for multiple service classes. The capacity allocation computation may minimize a cost function. The capacity allocation computation may also satisfy one or more mean delay guarantees for the multiple service classes, one or more tail distribution guarantees for the multiple service classes, or both one or more mean delay guarantees and one or more tail distribution guarantees for the multiple service classes.

8 Claims, 8 Drawing Sheets

OTHER PUBLICATIONS

I. Toshihide et al., "Resource Allocation Problems: Algorithmic Approaches," The MIT Press, pp. 1-2, 15-20 and 53-58, 1988.

N. Bansal et al., "Analysis of SRPT Scheduling: Investigating Unfairness," Proceedings of Performance and ACM Sigmetrics, pp. 1-22, 2001.

P.J. Burke, "The Dependence of Delays in Tandem Queues", The Annals of Mathematical Statistics, vol. 35, No. 2, pp. 874-875, Jun. 1964.

E.G. Coffman, Jr. et al., "Waiting Time Distributions for Processor-Sharing Systems," Journal of the Association for Computing Machinery, vol. 17, No. 1, pp. 123-130, Jan. 1970.

D.S. Hochbaum et al., "Convex Separable Optimization Is Not Much Harder Than Linear Optimization," Journal of the Association for Computing Machinery, vol. 37, No. 4, pp. 843-862, Oct. 1990.

W.E. Leland, "Load-Balancing Heuristics and Process Behavior," Proceedings of Performance and ACM Sigmetrics, pp. 54-69, 1986.

P. Jelenković et al., "Resource Sharing with Subexponential Distributions," Proceedings of IEEE INFOCOM, vol. 3, 10 pages, Jun. 2002.

Z. Liu et al., "Optimal Control of Resource Allocation in e-Business Environments with Strict Quality-of-Service Performance Guarantees," Proceedings of the 41st IEEE Conference on Decision and Control, FrP02-1, pp. 4431-4439, Dec. 2002.

D.A. Menasće et al, "Business-Oriented Resource Management Policies for E-Commerce Servers," Performance Evaluation 42, An International Journal, pp. 223-239, 2000.

A.P. Zwart et al, "Sojourn Time Asymptotics in the M/G/1 Processor Sharing Queue," Queueing Systems 35, pp. 141-166, 2000.

Pramod Pancha, "Guaranteeing Bandwidth . . . Networks", Proc. of IEEE Global Telecommunications Conference, Nov. 14-16, 1995, pp. 1064-1070, vol. 2.

1995, Proc. of IEEE Global Telecommunications Conference, vol. 2 1064p-1070p, Pancha P. et al., "Guaranteeing bandwidth and minimizing delay in packet-switched (ATM) networks" (Nov. 14-16, 1995).

* cited by examiner

FIG. 6A

TABLE 1

| $\varepsilon$ | 0.1 | 0.01 | 0.001 | $10^{-4}$ | $10^{-5}$ |
|---|---|---|---|---|---|
| LB (TAIL) | 5.56 | 11.15 | 16.60 | 22.22 | 27.91 |
| LB (MEAN & TAIL) | 13.85 | 15.26 | 16.86 | 22.47 | 27.97 |
| UB (TAIL) | 16.26 | 24.16 | 31.68 | 38.33 | 45.15 |
| UB (MEAN & TAIL) | 16.27 | 24.26 | 31.77 | 38.82 | 45.22 |

FIG. 6B

TABLE 2

| $T$ | 2 | 3 | 4 | 5 | 6 |
|---|---|---|---|---|---|
| LB (TAIL) | 6.76 | 8.83 | 11.15 | 13.42 | 15.55 |
| LB (MEAN & TAIL) | 6.76 | 9.93 | 15.26 | 20.95 | 28.11 |
| UB (TAIL) | 9.67 | 16.26 | 24.16 | 33.78 | 44.33 |
| UB (MEAN & TAIL) | 9.72 | 16.37 | 24.26 | 33.95 | 44.42 |

FIG. 6C

TABLE 3

| $K$ | 10 | 20 | 30 | 40 | 50 |
|---|---|---|---|---|---|
| LB (TAIL) | 10.40 | 11.06 | 11.16 | 11.30 | 11.24 |
| LB (MEAN & TAIL) | 13.34 | 14.39 | 14.35 | 14.93 | 15.01 |
| UB (TAIL) | 22.88 | 23.73 | 24.42 | 24.53 | 24.52 |
| UB (MEAN & TAIL) | 23.31 | 24.29 | 24.52 | 24.58 | 24.58 |

FIG. 6D

TABLE 4

| $T^\Delta$ | 5% | 10% | 15% | 20% | 25% |
|---|---|---|---|---|---|
| 4 | 0.79 | 0.89 | 1.15 | 1.45 | 1.7 |
| 8 | 1.05 | 1.2 | 1.43 | 1.66 | 1.94 |
| 12 | 1.49 | 1.64 | 1.86 | 2.1 | 2.39 |
| 16 | 1.48 | 1.71 | 1.99 | 2.22 | 2.51 |
| 20 | 1.48 | 1.76 | 1.98 | 2.25 | 2.68 |

FIG. 6E

TABLE 5

| $K^\Delta$ | 5% | 10% | 15% | 20% | 25% |
|---|---|---|---|---|---|
| 40 | 0.78 | 0.91 | 1.09 | 1.21 | 1.36 |
| 80 | 0.83 | 1.03 | 1.26 | 1.45 | 1.74 |
| 120 | 0.9 | 1.08 | 1.29 | 1.61 | 1.94 |
| 160 | 0.75 | 0.93 | 1.13 | 1.52 | 1.9 |
| 200 | 0.82 | 1.04 | 1.3 | 1.75 | 2.22 |

FIG. 6F

TABLE 6

| $T^\Delta$ | 5% | 10% | 15% | 20% | 25% |
|---|---|---|---|---|---|
| 4 | 0.23% | -0.07% | -0.71% | -1.5% | -2.65% |
| 8 | 0.12% | -0.01% | -0.34% | -0.88% | -1.58% |
| 12 | 0.06% | -0.01% | -0.68% | -0.97% | -1.3% |
| 16 | -0.4% | -0.49% | -1.19% | -0.66% | -1.78% |

FIG. 7

710 — FOR EACH CLASS $k$, GIVEN THE DISTRIBUTION FUNCTION $F_k^t$ AND THE MEAN $m_k$ OF THE NOMINAL SERVICE TIME AT TIER $t$, THE END-TO-END DELAY SERVICE REQUIREMENT $(V_k, U_k, \varepsilon_k)$. FOR EACH TIER $t$, GIVEN THE NOMINAL TRAFFIC INTENSITY $q_t$ AND THE CAPACITY COST FUNCTION $f_t(c)$.

720 — FOR EACH $k, t$, COMPUTE $\phi_k^t = \min \{y : F_k^t(y) \geq 1 - \varepsilon_k\}$.

730 — Define $g_t(x^t) = f_t(q^t + 1/x^t)$, and solve $$\min \sum_t g_t(x^t)$$

$$\text{s.t.} \quad \sum_t m_k^t x^t / V_k \leq 1$$

$$0 \leq x^t \leq \min \{U_k / \phi_k^t : 1 \leq k \leq K\}$$

740 — THE OPTIMAL OBJECTIVE VALUE IS A LOWER BOUND TO THE CAPACITY ALLOCATION PROBLEM

810: FOR EACH CLASS $k$, GIVEN THE DISTRIBUTION FUNCTION $F_k^t$ AND THE MEAN $m_k$ OF THE NOMINAL SERVICE TIME AT TIER $t$, THE END-TO-END DELAY SERVICE REQUIREMENT $(V_k, U_k, \varepsilon_k)$. FOR EACH TIER $t$, GIVEN THE NOMINAL TRAFFIC INTENSITY $q_t$ AND THE CAPACITY COST FUNCTION $f_t(c)$.

820: FOR EACH $k, t$, DERIVE $F_k^{t,T}$: THE $T$-th CONVOLUTION OF $F_k^t$.

830: FOR EACH $k, t$, COMPUTE $\phi_k^t = \min\{y : F_k^{t,T}(y) \geq 1 - \varepsilon_k\}$.

840: Define $g_t(x^t) = f_t(q^t + 1/x^t)$, and solve $$\min \sum_t g_t(x^t)$$

$$\text{s.t.} \quad \sum_t m_k^t x^t / V_k \leq 1$$

$$0 \leq x^t \leq \min\{U_k/\phi_k^t : 1 \leq k \leq K\}$$

850: THE OPTIMAL OBJECTIVE VALUE IS A UPPER BOUND TO THE CAPACITY ALLOCATION PROBLEM. FOR THE SOLUTION $x^t$, $1/x^t + q^t$ IS A FEASIBLE CAPACITY ALLOCATION TO TIER $t$.

METHODS AND APPARATUS FOR COST MINIMIZATION OF MULTI-TIERED INFRASTRUCTURE WITH END-TO-END DELAY GUARANTEES

FIELD OF THE INVENTION

The present invention generally relates to data network infrastructure design techniques and, more particularly, to design techniques for minimizing cost associated with a data network infrastructure and providing particular performance guarantees on end-to-end delays for multiple classes of services.

BACKGROUND OF THE INVENTION

With the increasing bandwidth and connectivity associated with the Internet (or World Wide Web), electronic business or "e-business" (i.e., conducting business through the Internet) has become more and more popular. Many traditional services have been transformed or converted to Web-based services. E-business has not only become a cost effective solution for many traditional businesses, but it also creates new business opportunities. A variety of e-businesses now exist, ranging from, for example, on-line shopping, on-line auction, on-line reservation, on-line banking and on-line trading to customer relation management, personnel management, etc. E-business has become such a critical component of many companies that guaranteeing performance and availability has become essential.

Thus, the design and development of e-business infrastructure should meet a twofold challenge. On one hand, it must meet customer expectations in terms of quality of service (QoS). On the other hand, companies have to control information technology (IT) costs to stay competitive. It is therefore crucial to understand the tradeoff between costs and service levels so as to enable the determination of the most cost-effective architecture and system.

One of the most common architectures of e-business infrastructures is the multi-tier architecture, where requests are served by the system through different tiers of servers, from the front-end to the back-end, without necessarily going through all the tiers. Although architecturally simple, the system is quite complex and large in general, with multiple tiers of servers, each of which can have many components. A typical e-business system is comprised of hundreds of nodes with tens of applications running on them. Given the great complexity of the overall system, IT planners are constantly puzzled with questions regarding: how many servers to place at each tier in the current infrastructure; what layout can deliver the best QoS; is there enough capacity available to support the expected business opportunities and future growth.

Another important characteristic of today's e-business environment is the diversity of services that one system can support. Multiple classes of services are commonly provided to multiple clients, all of which are time-sharing and competing for the same set of resources. The service provider has contracts to each individual client and agrees to guarantee a certain level of QoS for each class of service.

Existing approaches for determining resource allocation to deliver end-to-end performance are quite limited. Most of these existing approaches have focused on a single tier and addressed either scheduling or load balancing issues.

Thus, a need exists for techniques that determine a capacity allocation in a multi-tiered system with multiple classes of services so as to minimize the infrastructure cost while satisfying the end-to-end performance guarantees.

SUMMARY OF THE INVENTION

The present invention provides techniques for determining a capacity allocation in a multi-tiered system.

In one aspect of the invention, a technique for designing capacity allocation for a multi-tiered computing system, each tier of the computing system having one or more computing devices (e.g., servers), comprises the following steps/operations. Input parameters relating to capacity allocation are obtained. A capacity allocation is computed based on at least a portion of the input parameters, the capacity allocation being computable such that one or more end-to-end performance measures are substantially satisfied for multiple service classes.

Further, the step/operation of computing the capacity allocation may further comprise substantially minimizing a cost function. The step/operation of computing the capacity allocation may further comprise substantially satisfying one or more mean delay guarantees for the multiple service classes. The step/operation of computing the capacity allocation may further comprise substantially satisfying one or more tail distribution guarantees for the multiple service classes.

Still further, the step/operation of computing the capacity allocation may further comprise substantially satisfying one or more mean delay guarantees and one or more tail distribution guarantees for the multiple service classes. The step/operation of computing the capacity allocation may further comprise formulating the capacity allocation computation (or problem) as an optimization problem so as to substantially satisfy the one or more mean delay guarantees and the one or more tail distribution guarantees for the multiple service classes. The optimization problem may be formulated as a separable convex programming problem with linear constraints. The separable convex programming problem may be solved by finding an optimal solution on a boundary of a convex hull representing feasible solutions to the programming problem. The separable convex programming problem may be solved in polynomial time.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 6A through 6F are diagrams tabularly illustrating bounds under different values when both mean and tail constraints are present, according to an embodiment of the present invention;

FIG. 7 is a flow diagram illustrating a process for determining a lower bound for both mean and tail distribution guarantees in accordance with illustrative principles of the present invention;

FIG. 8 is a flow diagram illustrating a process for determining an upper bound for both mean and tail distribution guarantees in accordance with illustrative principles of the present invention;

DETAILED DESCRIPTION OF PREFERRED EMBODIMENTS

Figure 1:
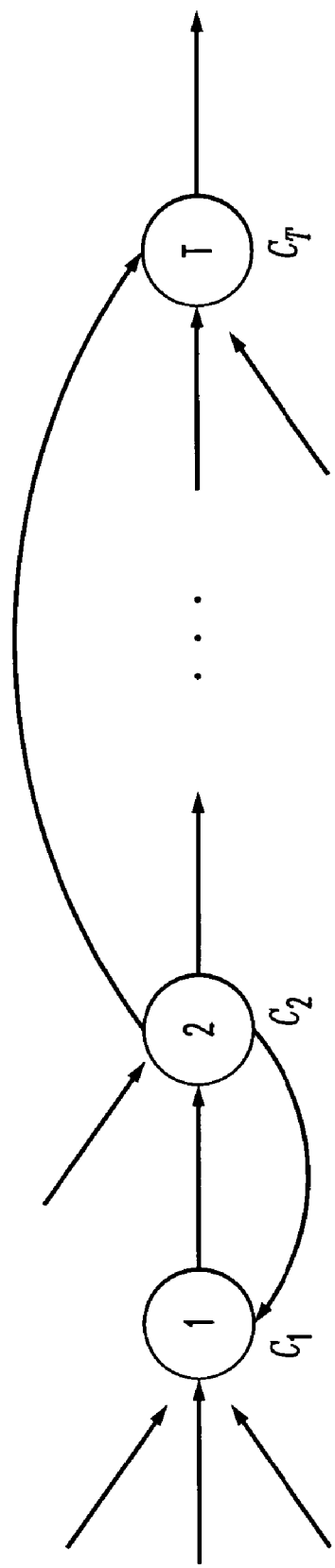
FIG. 1 is a block diagram illustrating a feed-forward multi-tier system in accordance with which illustrative principles of the present invention may be implemented.

The following description will illustrate the invention using an exemplary e-business environment. It should be understood, however, that the invention is not limited to use with any particular environment. The invention is instead more generally applicable for use with any data network environment in which it is desirable to determine a capacity allocation so as to, for example, minimize the infrastructure cost while satisfying end-to-end performance guarantees.

The remainder of the detailed description is organized as follows. In section 1, an introduction to principles of the invention is presented. In section 2, the illustrative problem under consideration is presented in the context of a general feed-forward network, and the two performance metrics of interest are introduced, namely, the mean and the tail distribution of the end-to-end response times. Section 3 focuses on mean performance guarantees, while section 4 focuses on the performance guarantees on tail distributions of the end-to-end response times. The results from section 3 and 4 are then combined, and an illustrative approach is described in section 5 with both types of end-to-end response time guarantees. Numerical results are used to demonstrate the illustrative performance of the inventive techniques in section 6. In section 7, some illustrative case discussions are presented. Illustrative design systems and methodologies are presented in section 8.

1. Introduction

As will be illustratively explained below, the present invention provides service guarantees on both the mean and the tail distribution of the end-to-end response times, where the mean response time is also referred to, in practice, as the average delay, and the tail distribution gives the percentage of requests that experience end-to-end delays higher than a pre-specified threshold. For example, a mean-delay performance guarantee can require average delay per request to be less than 5 seconds, and a tail distribution guarantee can require no more than 5% of requests experience delays greater than 15 seconds.

It is assumed that the cost of a given capacity allocation is a convex separable increasing function of the capacity assignment vector. That is, if capacity $c^t$ is assigned to tier t, then a cost of $f_t(c^t)$ will be incurred and total cost of assignment $(c^1, \ldots, c^T)$ to a T-tiered system is simply $$\sum_{t=1}^{T} f_t(c^t).$$

Such a cost function can be used to handle many e-business cost structures. For example, if f(c) is linear in c, then the cost structure is purely on the IT expenses. Also, $f_t(c^t)$ can be chosen to represent the mean delay or the tail probability of the delay at tier t, in this case, it represents profits or penalty related to the QoS contracts (i.e., performance agreements between service providers and service clients).

Further, the invention provides a nonlinear programming problem formulation and addresses its structural properties. It is shown that under the mean response time guarantees alone, the solution has an advantageous geometric interpretation. The invention also provides various methods to solve the problem.

The problem with guarantees on the tail distribution of response times is more complicated. The invention provides approximation methods which bound from above and from below the tail distribution of the end-to-end delay. With the upper bound, the tail distribution guarantee is ensured. Thus, the corresponding total cost is also an upper bound for the optimal solution. The lower bound for the cost function can be similarly obtained. It is shown that the inventive solution is only away from the optimal by a constant factor, which is independent of the service demands of the job classes at all tiers. It is also shown that the inventive techniques can achieve asymptotic optimality when the service requirement becomes stringent. Finally, the invention is described with regard to both types of end-to-end response time guarantees.

2. The Problem

In this illustrative description, a feed-forward multi-tier system is considered, as illustrated in FIG. 1. There are t= 1, ..., T server stations (or tiers) and k=1, ..., K classes of jobs. It is assumed that class k arrivals are Poisson with rate $\lambda_k$. Jobs of class k visit the stations along route k which is a deterministic sequence: v(k, 1), v(k, 2), ..., v(k, $L_k$). If v(k, l)=t, it is said that a class k job visits server station t at stage l. The routes are assumed to be feed-forward in the sense that for all k, $$v(k, 1) < v(k, 2) < \ldots < v(k, T_k),$$

where $T_k$ is the total number of hops (tiers) in route k. Denote $\delta_k^t = 1$ if route k will pass through station t and $\delta_k^t = 0$ otherwise. Then $\lambda_k^t = \delta_k^t \lambda_k$ is the arrival rate of class k jobs to station t.

At each server station, there could be multiple servers. It is assumed that each individual server has a unit capacity and the total number of servers $c^t$ at station t is yet to be determined. Let $\vec{c} = (c^1, c^2, \ldots, c^T)$ be a capacity assignment so that station t has capacity $c^t$. We assume that all servers that belong to station t work together and execute the incoming requests in a processor-sharing (PS) manner.

The nominal service requirements of class k jobs at station t are independent and identically distributed random variables $S_k^t$ with mean $m_k^t = E[S_k^t]$. The term 'nominal' is used because the capacity $c^t$ at tier t is a decision variable. Therefore, if capacity $c^t$ is assigned to tier t, then the mean service time for class k jobs at tier t is $m_k^t/c^t$.

Let $q^t$ be the nominal server utilization at station t such that $$q^t = \sum_k \lambda_k^t m_k^t.$$

Then, under capacity $c^t$, the server utilization at station t will be $\rho^t = \Sigma_k \lambda_k^t m_k^t / c^t = q^t / c^t$. In order for the system to be stable (i.e., the workload does not build up infinitely as time goes on), the minimum capacity assignment c must satisfy:

$c^t > q^t$, for all t=1, ..., T.

Under the processor-sharing service discipline, all server stations are symmetric queues thus quasi-reversible. For a stationary open network of quasi-reversible stations, it is known that product form holds and we further have the following two properties:

i) the state variables for each station are independent of those for other stations; and ii) the arrival process for every class of jobs at each station has the PASTA property; here PASTA stands for Poisson Arrivals See Time Average, which means that at any arriving epoch, the new arrival always sees the system in average states (e.g., the number of jobs waiting in queue seen by any new arrival is the average queue length, etc).

Furthermore, based on the Burke's theorem, we have iii) the arrival processes at each station in a feed-forward network are also Poisson.

Let $R_k^t$ be the stationary response time random variable for class k jobs at station t. Denote $R_k$ the stationary end-to-end response time random variable of class k jobs. Based on properties i-iii), we then have for each k, $\{R_k^t, t=1, 2, \ldots, T\}$ are independent random variables, and that $$R_k \stackrel{d}{=} \sum_{t=1}^T R_k^t, \text{ where } \stackrel{d}{=} \text{ denotes equivalence in distribution}$$

Based on the product form, we know that the number of jobs at station t is the same as that in the M/M/1 queues. Therefore, $$E[R_k^t] = \frac{m_k^t / c^t}{1 - \rho^t} = \frac{m_k^t}{c^t - q^t},$$

and the mean end-to-end delay for class k jobs is $$E[R_k] = \sum_t E[R_k^t] = \sum_t \frac{m_k^t}{c^t - q^t}.$$

We shall consider the following two types of service guarantees:

$E[R_k] \leq \overline{U}_k$, for each k    (1)

and $P[R_k > U_k] \leq \epsilon_k$, for each k    (2)

Constraint (1) guarantees the average end-to-end response time of class k jobs to be no more than $\overline{U}_k$, and constraint (2) guarantees that the probability that the end-to-end delay of class k is greater than $U_k$ is no more than $\epsilon_k$.

It is assumed that the cost structure is a separable increasing function of the capacity assignment $c = (c^1, c^2, \ldots, c^T)$. That is, for all t=1, ..., T, $f_t(\cdot)$ is a convex increasing function. If capacity $c^t$ is assigned to tier t, then a cost of $f_t(c^t)$ will be incurred. The total cost of this assignment is simply $$\sum_{t=1}^T f_t(c^t).$$

The problem is to minimize the overall cost of the capacity allocation with one or both of these end-to-end response time guarantees.

3. Mean Delay Guarantee

We first consider the problem with average delay guarantees of the form in (1). This is a common and natural form of service level requirements from the customers. The problem of finding the most cost-effective capacity allocation such that the mean delay requirement is guaranteed can be formulated as:

$$\min \sum_t f_t(c^t) \quad (3)$$

$$s.t. \quad \sum_t \frac{m_k^t}{c^t - q^t} \leq \overline{U}_k, k = 1, \ldots, K; \quad (4)$$

$$c^t > q^t, t = 1, \ldots, T. \quad (5)$$

Condition (5) is exactly the stability condition. The capacity $c^t$ required by each tier t must be at least $q^t$ to ensure the system is stable, and must be greater than $q^t$ to have finite response time. Then, a new variable $x^t$ can be assigned, such that $c^t = q^t + 1/x^t$. Here, $1/x^t$ is the extra capacity (above the minimum requirement $q^t$) allocated to tier t. Denote further $w_k^t = m_k^t / \overline{U}_k, t=1, \ldots, T; k=1, \ldots, K.$ Here, $w_k^t$ can be interpreted as the weights (or relative ratio) of the nominal service times for a class-k job at tier t to its required mean end-to-end upper bound $\overline{U}_k$.

Now, the problem is simplified to the following:

(M)

$$\min \sum_t g_t(x^t)$$

$$s.t. \quad \sum_t w_k^t x^t \leq 1, k = 1, \ldots, K, \quad (6)$$

$$x^t \geq 0, t = 1, \ldots, T, \quad (7)$$

where $g_t(x^t) = f_t(q^t + 1/x^t) = f_t(c^t)$. The problem becomes to minimize the total cost which occurs due to the extra system capacity $1/x^t$. It is natural to assume function $f_t$ is non-decreasing for each t. Therefore, $g_t$ is a non-increasing function. Moreover, in the rest of this section, we assume $g_t$ is convex function. It is easy to see that this assumption is satisfied if $f_t$ is convex. However, this is not necessary. This assumption is also satisfied for some well-known concave cost function: for example, $f_t(c^t) = \ln(c^t)$.

Note that we also relaxed the last constraint (5) from > to ≧ so that the feasible region is compact. It is obvious that $x^t=0$ will never be the optimal solution.

For notation simplicity, we will use $\vec{x}$ and $\vec{w}_k, k=1,\ldots,K$, to denote vectors:

$$\vec{x}=(x^1,\ldots,x^T),$$

$$\vec{w}_k=(w_k^1,\ldots,w_k^T).$$

The feasibility condition becomes $$\vec{w}_k \cdot \vec{x} \leq 1, k=1,\ldots,K.$$

The optimization problem (M) has an advantageous form which leads to an immediate simplification with natural interpretations. Let $\Omega$ denote the feasible region, that is, $\Omega = \{\vec{x} \in R_+^T | \vec{w}_k \cdot \vec{x} \leq 1, k=1,\ldots,K\}$. Note that $\Omega$ is a polyhedron set determined by the vectors $\vec{w}_1,\ldots,\vec{w}_K$ in the positive quadran $R_+^T$, we also denote $\Omega$ as $Polyhedron_+(\vec{w}_1,\ldots,\vec{w}_K)$.

Let $\{\vec{w}_l, l \in S\}$ be the extreme vectors determined by the extreme vertices of $Polyhedron_+(\vec{w}_1,\ldots,\vec{w}_K)$, then each vector $\vec{w}_k, k=1,\ldots,K$ is dominated by a convex combination of the extreme vectors $\{\vec{w}_l, l \in S\}$, i.e., $$\vec{w}_k \leq \sum_{l \in S} \alpha_{k,l} \vec{w}_l, \sum \alpha_{k,l} = 1, \alpha_{k,l} \geq 0.$$

Then, for all $\vec{x} \in R_+^T$ that satisfies $\vec{w}_l \cdot \vec{x} \leq 1, l \in S$, it must also satisfy $\vec{x} \in \Omega$. This is because $\vec{x} \geq 0$, and $$\vec{w}_k \cdot \vec{x} \leq \sum_{l \in S} \alpha_{k,l} \vec{w}_l \cdot \vec{x} \leq \sum_{l \in S} \alpha_{k,l} \sum \alpha_{k,l} = 1.$$

This means that the constraint corresponding to $\vec{w}_k$ can be derived from the constraints corresponding to extreme vectors $\{\vec{w}_l, l \in S\}$. Therefore, we can ignore the constraints corresponding to the vectors $\vec{w}_k$ if it is dominated by a convex combination of some other $\vec{w}$ vectors. Note that the extreme vectors $\{\vec{w}_l, l \in S\}$ are completely determined by the extreme vertices. $Polyhedron_+(\vec{w}_1,\ldots,\vec{w}_K)$ is simply a convex hull of all the extreme vertices. We then have the following property:

Property 1. The optimal solution to (M) is determined by the vertices of $Polyhedron_+(\vec{w}_1,\ldots,\vec{w}_K)$.

In other words, if a point $\vec{w}_k$ lies in the interior of the polyhedron, then it will not play a role in determining the optimal solution. In the context of the original problem, when allocating server capacities, one class of jobs satisfying the mean end-to-end response time constraint could imply another class of jobs' mean response time constraint be automatically satisfied. In this case, the mean response time constraint for the latter job class is less stringent, and can be derived from the constraint for the former job class. Here, the extreme vertices of the polehedral correspond to the class of jobs whose response time constraints are more stringent, and can not be derived from the constraints for other job classes.

After simplifying the formulation, we now turn to how to find the optimal solutions to the problem. The optimization problem (M) is a separable convex programming problem with linear constraints. Note that such a separable convex programming problem with linear constraints can be converted into a linear program and solved in polynomial time. Such a program will be illustrated below.

Furthermore, observe that the objective function in (M) is monotone non-increasing in each variable, hence, the optimal solution must lie on the boundary of the feasible region. That is:

Property 2. The optimal solution to (M) must be on the boundary of $Polyhedron_+(\vec{w}_1,\ldots,\vec{w}_K)$.

Notice that this is slightly counter-intuitive comparing with the general convex optimization problems where the optimal solutions are very often interior points.

3.1. Mean Delay Guarantee with Linear Cost Function

In the rest of this section, we shall consider the case when the cost function is linear. That is, $f_t(c^t)=c^t$. Thus the cost structure is purely on the IT expenses. The problem of minimizing the total capacity such that the mean delay constraints are satisfied can then be written as $$\min \sum_t 1/x^t \quad (M1)$$

$$s.t. \sum_t w_k^t x^t \leq 1, k=1,\ldots,K; \quad (8)$$

$$x^t \geq 0, t=1,\ldots,T, \quad (9)$$

Observe from formulation (M1) that the optimal solution $x^*$ does not depend on the arrival intensity. That is, the extra capacity required to ensure the mean end-to-end delay guarantees is only determined by the weights $w_k^t$'s. It is therefore easy to adapt the above planning problem on-line for the live system, since one simply needs to add the solution for the extra capacity to the predicted capacity requirement for the incoming loads.

The analysis of the dual problem can help exploit advantageous structures and properties as well as facilitate developing efficient solutions. Furthermore, the dual solution often plays a key role in the sensitivity and robustness analyses. We now consider the dual problem.

First we examine the Lagrangian problem, $$\max_{x,s_1,\ldots,s_K} L = -\sum_t 1/x^t + \sum_k s_k \left(1 - \sum_t w_k^t x^t\right), \quad (10)$$

where the $s_k$'s are the Lagrangian multipliers.

The Karush-Kuhn-Tucker (KKT) conditions lead to the following properties for the optimal solutions:

(optimality condition) (11)

$$\frac{\partial L}{\partial x^t} = 1/(x^t)^2 - \sum_k s_k w_k^t = 0, \quad t = 1, \ldots, T$$

(complementary slackness) (12)

$$s_k \left(1 - \sum_t w_k^t x^t\right) = 0, \quad k = 1, \ldots, K$$

(feasibility condition) (13)

$$\sum_t w_k^t x^t \leq 1, \quad k = 1, \ldots, K$$

(nonnegative condition)

$$x^t \geq 0, \quad t = 1, \ldots, T$$

(nonnegative condition) (14)

$$s_k \geq 0, \quad k = 1, \ldots, K$$

Proposition 1. For the optimal solution $\vec{x}$ and $s_1, \ldots, s_K$, $$\sum_k s_k = \sum_t 1/x^t. \quad (15)$$

This may be proven as follows. From complementary slackness condition (12), $$\sum_k s_k = \sum_k s_k \sum_t w_k^t x^t = \sum_t \sum_k s_k w_k^t x^t$$

$$= \sum_t x^t \sum_k s_k w_k^t = \sum_t x^t \frac{1}{(x^t)^2} = \sum_t 1/x^t,$$

where the second to the last equality follows from the optimality condition (11).

For given $s = (s_1, \ldots, s_K)$, the Lagrangian dual function $q(s)$ is defined as $$q(s) = \sup_{\vec{x} \geq 0} \left\{ -\sum_t 1/x^t + \sum_k s_k \left(1 - \sum_t w_k^t x^t\right) \right\}$$

$$= \sum_k s_k - \sum_t \inf_{\vec{x} \geq 0} \left(1/x^t + x^t \sum_k s_k w_k^t\right)$$

$$= \sum_k s_k - 2 \sum_t \sqrt{\sum_k s_k w_k^t}.$$

Hence the dual problem of (M1) is $$g = \max 2 \sum_t \sqrt{\sum_k s_k w_k^t} - \sum_k s_k \quad (D1)$$

$$\text{s.t.} \quad s_k \geq 0, \quad k = 1, \ldots, K.$$

Define h to be $$h = \max \sum_t \sqrt{\sum_k \hat{s}_k w_k^t} \quad (D2)$$

$$\text{s.t.} \sum_k \hat{s}_k = 1, \quad \hat{s}_k \geq 0, k = 1, \ldots, K.$$

Then g can be written as $$g = \max_{s \geq 0} 2 \sum_t \sqrt{\sum_k s_k w_k^t} - \sum_k s_k$$

$$= \max_{s \geq 0} 2 \sqrt{\sum_k s_k} \sum_t \sqrt{\sum_k \frac{s_k}{\sum_j s_j} w_k^t} - \sum_k s_k$$

$$= \max_{u \geq 0} 2uh - u^2 \quad \left(\text{Set } u^2 = \sum_k s_k\right)$$

$$= h^2.$$

The minimum in the last step is taken at $u=h$. This leads to the following proposition.

Proposition 2. Assume the optimal solution for Problem (D2) is $\hat{s}_1, \ldots, \hat{s}_K$ with objective equal to h. The optimal solution $s_1, \ldots, s_K$ for Problem (D1) is then $s_k = h^2 \hat{s}_k$. And the optimal objective value is $g = h^2$.

Problem (D2) can be re-written as $$h = \max \sum_t \sqrt{w_0^t} \quad (D3)$$

$$\text{s.t.} \quad \vec{w}_0 = \sum_k \hat{s}_k \vec{w}_k \quad \sum_k \hat{s}_k = 1, \quad \hat{s}_k \geq 0, k = 1, \ldots, K.$$

This problem has an advantageous geometric interpretation. We want to find the best point $\vec{w}_0$ on Polyhedron$_+(\vec{w}_1, \ldots, \vec{w}_K)$ such that the objective function $\Sigma_t \sqrt{w_0^t}$ is maximized.

Figure 2:
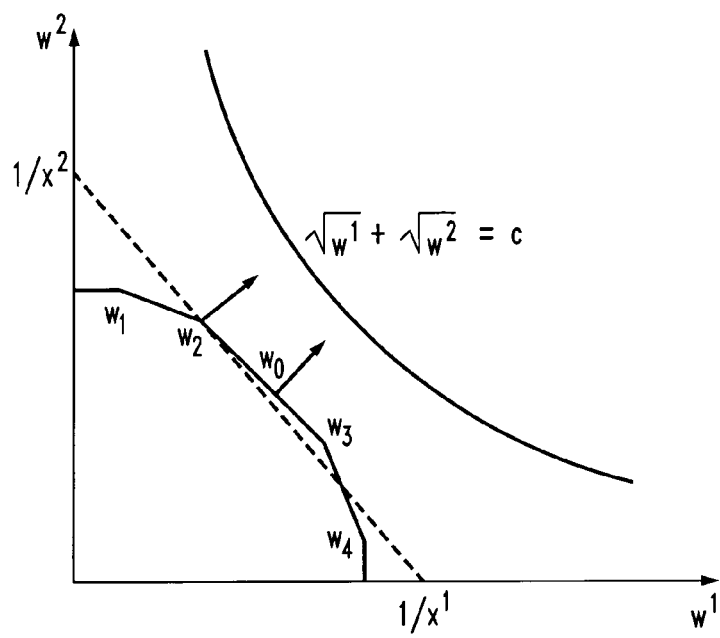
FIG. 2 is a diagram graphically illustrating a geometric interpretation of a problem, according to an embodiment of the present invention.

The geometric interpretation of problem (D3) is illustrated in FIG. 2. Consider the T-dimensional space, where each point corresponds to a weighted service time requirement vector $\vec{w} = (w^1, \ldots, w^T)$. Let Polyhedron$_+(\vec{w}_1, \ldots, \vec{w}_K)$ be the polyhedron in the positive quadran $R_+^T$ determined by $\vec{w}_1, \ldots, \vec{w}_K$. Problem (D3) is to move the surface $\Sigma_t \sqrt{w^t} = c$ toward the origin and find the first point $\vec{w}_0$ on the boundary of Polyhedron$_+(\vec{w}_1, \ldots, \vec{w}_K)$, where the surface and the polyhedron intersect. For a given vector $\vec{x} = (x^1, \ldots, x^T)$, the hyperplane $\vec{w} \cdot \vec{x} = 1$ is uniquely determined such that $1/x^t$ is the intersection of the hyperplane with the t-axis. Therefore, if $\vec{x}$ is feasible to problem (M1), then Polyhedron$_+(\vec{w}_1, \ldots, \vec{w}_K)$ must stay below the corresponding hyperplane because $\vec{w}_k \cdot \vec{x}$ must be no more than 1 for every k. We call this hyperplane feasible hyperplane. In order for a hyperplane passing through $\vec{w}$ to be feasible, $\vec{w}$ must lie on some face of the polyhedron, because otherwise the polyhedron would not be under the hyperplane. This implies that for any vector $\vec{w}_k$, if the corresponding constraint in (M1) is binding, then it must lie on some face.

The gradient of the objective function $\Sigma_t\sqrt{w^t}$ of (D3) is $(1/\sqrt{w^t}, \ldots, 1/\sqrt{w^T})/2$. These gradients are drawn by the arrows in FIG. 2. The dash line in the graph represents the hyperplane passing through $w_2$ whose normal is $$(1/\sqrt{w_2^1}, \ldots, 1/\sqrt{w_2^T})/2.$$

This hyperplane can be written $\Sigma_t(w^t - w_2^t)/\sqrt{w_2^t} = 0$. If the whole polyhedron is under this hyperplane, then $\vec{w}_2$ is the optimal solution because there is no direction to improve from $\vec{w}_2$. We call this hyperplane w-optimal hyperplane because it determines whether $\vec{w}$ is the optimal solution or not. Therefore, for any $\vec{w}$, if the corresponding w-optimal hyperplane is a feasible hyperplane, then $\vec{w}$ is optimal solution. On the other hand, in order for $\vec{w}$ to be optimal, the whole polyhedron must be under its corresponding w-hyperplane. The above observation leads to the following Lemma.

Lemma 3. The optimal solution of (D3) is attained at $w_0$ if and only if $$\sum_t \frac{w_k^t - w_0^t}{\sqrt{w_0^t}} \le 0 \text{ for all } k. \tag{16}$$

Remark 4. Consider the case with only one single job class whose weighted service requirement vector is $\vec{w}_1$. The hyperplane $\vec{w} \cdot \vec{x} = 1$, where $$\vec{x} = \left( \frac{1/\sqrt{w_1^t}}{\sum_\tau \sqrt{w_1^\tau}}, \quad t = 1, \ldots, T \right),$$

is a w-optimal hyperplane. Therefore, $$\vec{x} = \left( \frac{1/\sqrt{w_1^t}}{\sum_\tau \sqrt{w_1^\tau}}, \quad t = 1, \ldots, T \right)$$

gives the optimal allocation to the original problem (M1).

In the optimal dual solution, if $s_k > 0$, then the corresponding constraint in (M1) is binding and any increase of $\vec{w}_k$ will require the increase of capacity to avoid missing the mean response time constraint for class k. Therefore, we call those classes for which $s_k > 0$ bottleneck classes. The optimal solution ($\hat{s}_k$) to problem (D2) reflects the relative stringent level of the bottleneck classes, and $\vec{w}_0 = \Sigma_k \hat{s}_k \vec{w}_k$ is the pooled equivalent service requirement for the bottleneck classes. Optimally allocating capacity to satisfy the mean end-to-end response time constraint for all classes is equivalent to finding the optimal capacity allocation for this equivalent bottleneck (virtual) class.

Theorem 5. Assume $\vec{w}_0$ is the optimal solution to problem (D3), then $\vec{x}$ is an optimal solution to (M) if and only if it is the optimal solution to the following optimization problem:

$$\min \sum_t 1/x^t \tag{P}$$

$$s.t. \quad \vec{w}_0 \cdot \vec{x} \le 1, \vec{x} \ge 0,$$

$$\text{where } \vec{w}_0 = \frac{\sum_k s_k \vec{w}_k}{\sum_j s_j}.$$

This may be proven as follows. First, because of the strict convexity of the objective function, (P) must have a unique solution.

The optimal solution $\vec{y}$ to the single constrained optimization problem (P) can be expressed as follows:

$$y^t = \frac{1}{\sqrt{w_0^t \sum_\tau \sqrt{w_0^\tau}}}, \quad t = 1, \ldots, T. \tag{17}$$

To see this, we let $s_0$ be the dual variable corresponding to the single constraint. Then from (11), we have $$y^t = 1/\sqrt{w_0^t s_0}, t = 1, \ldots, T.$$

The complementary slackness constraint (12) leads to $\Sigma_t w_0^t y^t = 1$. Setting $s_0 = (\Sigma_t \sqrt{w_1^t})$, we then have (17).

Now we express $\vec{w}_0$ by $s_k$—the solution to (D1):

$$w_0^t = \frac{\sum_k s_k w_k^t}{\sum_k s_k} = \frac{1/(x^t)^2}{\sum_k s_k} = \frac{1}{(x^t)^2 \sum_t 1/x^t}.$$

where the second equality follows from the optimality condition (11), and the last equality is based on Proposition 1.

Substitute this expression into (17), we have $$y^t = \frac{x^t \sqrt{\sum_t 1/x^t}}{\sum_t \frac{1}{x^t \sqrt{\sum_t 1/x^t}}} = x^t.$$

We end this section by considering two simplest systems: single-tier system and two-tier system. It is straight forward that the optimal solution to the allocation problem when T=1 is $x^1 = 1/\max_k w_k^1$. The optimal capacity allocation for the two-tier system is given by the following theorem.

Theorem 6. Consider the two-tier system. Let $$\tilde{w} = \arg\max_{1 \leq k \leq K} \sum_t \sqrt{w_k^t}.$$

If $\sum_t \dfrac{w_k^t - \tilde{w}^t}{\sqrt{\tilde{w}^t}} \leq 0$, for all $k$, then the optimal capacity allocation is $$1/x^t = \left(\sqrt{\tilde{w}^t} \sum_\tau \sqrt{\tilde{w}^\tau}\right).$$

Otherwise, let $\hat{w}$ be the vertex in $\{w_1, \ldots, w_K\}$ that are connected to $\bar{w}$ on the boundary of the polyhedron such that $$\sum_t \frac{\hat{w}^t - \tilde{w}^t}{\sqrt{\tilde{w}^t}} \geq 0 \text{ and } \theta = \frac{\tilde{w}^2 - \hat{w}^2}{\tilde{w}^1 - \hat{w}^1},$$

then the optimal solution to problem (M) is $$x^t = 1 \Big/ \left(\sqrt{w^t} \sum_\tau \sqrt{w^\tau}\right),$$

where $$w^1 = \frac{\tilde{w}^2 - \theta \tilde{w}^1}{\theta^2 - \theta}$$

and $w^2 = \theta^2 w^1$.

This may be proven as follows. The first part follows immediately from Lemma 3 and Theorem 5. For the second part, note that $$w = \left(\frac{\tilde{w}^2 - \theta \tilde{w}^1}{\theta^2 - \theta}, \theta^2 w^1\right)$$

is the best point along the boundary passing both $\tilde{w}$ and $\hat{w}$, so it has to be the optimal.

4. Tail Distribution Guarantee

In this section, we consider the capacity planning problem with the tail distribution guarantee constraint (2). The problem can be formulated as:

$$(\text{T}) \quad \min \sum_t f_t(c^t)$$

$$\text{s.t. } P[R_k > U_k] \leq \varepsilon_k, \quad k = 1, \ldots, K; \quad (18)$$
$$c^t \geq q^t, \quad t = 1, \ldots, T.$$

As mentioned in section 2, for each class k, the steady state end-to-end response time $R_k$ stochastically equals the sum of the steady state delays at each tier which is a M/G/1 PS queue. Therefore, to study the tail probability guarantee, we need to first understand the tail behavior of the response time of PS queues. Here, we assume the delay of class k at tier t $R_k^t$ follows a distribution function $G_k^t(c, y) = P[R_k^t \leq y | c^t = c]$. Note that the distribution of $R_k^t$ does not depend on the capacity allocation at the other tiers.

Then, because the delay at each tier is independent, for each class k, the left hand side of the constraint (18) can be computed by the convolution of $G_k^t$ with respective to y over all the tiers visited by class k jobs. After convolution, the left hand side of the constraint (18) is written as a function of the capacity allocation vector $\vec{c} = (c^1, c^2, \ldots, c^T)$. Therefore, problem (T) becomes a non-linear program. However, there is no closed-form (besides Laplace transform) expression for the response time tail distribution under PS, so it is almost impossible to derive the closed-form expression for the left hand side of (18) as a function of $\vec{c}$. Even in some cases, this expression (or approximation) is available, it usually will be a very complicated function which makes the non-linear problem hard to solve. Then, one will naturally search for good near optimal solutions and/or bounds.

In accordance with the invention, by approximating the constraint (18), we derive upper and lower bounds and give a near optimal solution to problem (T). Indeed, under some assumptions on the distribution function $G_k^t$, the solution is proven to be asymptotically optimal.

4.1. Lower Bound

To derive a lower bound for problem (T), we want to relax the constraint (18). The following Lemma gives a straightforward way to relax (18).

Lemma 7. If the end-to-end delays $R_k$ for all classes satisfy constraint (2), then $$P[R_k^t > U_k] \leq \varepsilon_k, \ 1 \leq k \leq K, \ 1 \leq t \leq T. \quad (19)$$

This may be proven as follows. For each k, t, because $$R_k \stackrel{d}{=} \sum_\tau R_k^\tau$$

and $\Sigma_\tau R_k^\tau \geq R_k^t$, $$P[R_k^t > U_k] \leq P\left[\sum_\tau R_k^\tau > U_k\right] \leq \varepsilon_k.$$

Lemma 7 basically says that if the tail distribution guarantees on the end-to-end delay are satisfied, then these guarantees will be satisfied for the delay at each tier. Therefore, replacing constraint (2) by (19), we can obtain a lower bound for problem (T) which is stated as follows.

Theorem 8. $\Sigma_t f_t(c_*^t)$ is a lower bound on problem (T), where $$c_*^t = \max_{k \in K(t)} \min\{c : G_k^t(c, U_k) \geq 1 - \varepsilon_k\}. \quad (20)$$

4.2 Feasible Solution and Upper Bound

The solution $\vec{c}_*$ we obtain in (20) provides a lower bound for problem (T) but it is not feasible to (T) and does not guarantee the tail distribution requirement on the end-to-end delay. To derive a feasible solution for (T), we first define the random variable $R_k^{t,n}$ to be the summation of n independent copies of $R_k^t$. Denote $\mathfrak{I}_k$ the set of tiers that will be visited by class k jobs, k=1, ..., K, and denote $T_k$ the total number of tiers in set $\mathfrak{I}_k$. Note that if a class k job does not visit tier t, then we set $R_k^t = 0$. Further, we assume the following.

Assumption 1. For each class k, if $$P[R^{t,T_k} > U_k] \leq \varepsilon_k, \text{ for each } t \in \mathcal{J}_k, \quad (21)$$

then $$P\left[\sum_\tau R_k^t > U_k\right] \leq \varepsilon_k.$$

Assumption 1 is satisfied if for any fixed class k, all $R_k^t$'s are comparable in the stochastic ordering sense, $1 \leq t \leq T$. We say that X and Y are comparable in the stochastic ordering sense $\leq_{st}$ if either $X \leq_{st} Y$ or $Y \leq_{st} X$. Indeed, in this case, for each fixed class k, there is a bottleneck tier t* such that the response time $R_k^{t*}$ stochastically dominates the others, so that $P[R_k^{t*,T} > U_k] \leq \varepsilon_k$ implies that $P[\Sigma_t R_k^t > U_k] \leq \varepsilon_k$. In particular, if for any fixed class k, $R_k^t$'s are all exponential random variables or are all Weibullian random variables with the same shape parameter, then they are stochastically comparable. Also, if for any fixed class k, $S_k^t$'s are identical in distribution, then one can show using coupling arguments that $R_k^t$'s are stochastically comparable.

Define $G_k^{t,n}(c, y)$ to be the n-th convolution of $G_k^t(c, y)$ with respective to y, and then $$G_k^{t,n}(c, y) = P[R_k^{t,n} \leq y | c^t = c]. \quad (22)$$

The following theorem gives a feasible solution to problem (T).

Theorem 9. Suppose Assumption 1 holds. Then $\vec{c^*}$ is feasible to problem (T), hence guarantees the tail distribution constraints. Here $\vec{c^*}$ $(c^{*1}, \ldots, c^{*T})$ with $$c^{*t} = \max_{k \in K(t)} \min\{c \geq q^t : G_k^{t,T_k}(c, U_k) \geq 1 - \varepsilon_k\}. \quad (23)$$

And $\Sigma_t f_t(c^{*t})$ is an upper bound for problem (T).

This may be proven as follows. It suffices to show (18) is satisfied under the allocation of $c^{*t}$. First by the definition of $c^{*t}$, it is easy to see that for each t and k, $$P[R^{t,T_k} < U_k] \leq \varepsilon_k, \text{ if } k \in K_t, \quad (24)$$

where $K_t$ denotes the set of job classes that require to be served at tier t. This is equivalent to (21). Then (18) follows under Assumption 1.

4.3. Asymptotic Optimality

In this section, we discuss the effectiveness of the solutions presented above in sections 4.1 and 4.2. For this, we shall make the following simplifying assumption:

Assumption 2. For each class k and each tier t, $$P[R_k^t > y] \sim P\left[\frac{S_k^t}{c^t - q^t} > y\right]. \quad (25)$$

Note that (25) is only an approximation. In the case of M/G/1 PS queue with subexponential service times, the above assumption has been shown to be asymptotically true for large y when $F_k^t$ has a heavier tail than $e^{-\sqrt{y}}$. Here $F_k^t$ is the distribution function for the nominal service requirement random variable $S_k^t$ for class k jobs at tier t. Then, under assumption 2, we have $$G_k^t(c, U_k) = F_k^t((c - q^t)U_k).$$

This gives us a way to express the lower bound in (20) as a function of the nominal service time distribution. Furthermore, if we denote the complementary of $F_k^t$ to be $\overline{F_k^t} = 1 - F_k^t$, and the inverse function of $\overline{F_k^t}$ to be $$\varphi_k^t(\varepsilon) = \arg \min_y \{\overline{F_k^t}(y) \leq \varepsilon\},$$

then, the lower bound in (20) can be written as $$c_*^t = q^t + \max_{k \in K(t)} \varphi_k^t(\varepsilon_k) / U_k. \quad (26)$$

We denote $F_k^{t,n}$ to be the n-th convolution of $F_k^t$, and the complementary $\overline{F_k^{t,n}} = 1 - F_k^{t,n}$. Then, following the above argument, we can simplify the upper bound in (23) as $$c^{*t} = q^t + \max_{k \in K(t)} \varphi_k^{t,T_k}(\varepsilon_k) / U_k, \quad (27)$$

where $$\varphi_k^{t,n}(\varepsilon) = \arg \min_y \{\overline{F_k^{t,n}}(y) \leq \varepsilon\}.$$

Assumption 3. For each k, t, there exists $\kappa_0 < \infty$ and $\delta_0 > 0$, such that $$\limsup_{y \to \infty} \frac{\overline{F_k^{t,T_k}}(y)}{\overline{F_k^t}(y)} = \kappa_0, \quad (28)$$

and for any $\delta_1 > 0$, $$\limsup_{y \to \infty} \frac{\overline{F_k^t}(y(1+\delta_1))}{\overline{F_k^t}(y)} \leq \frac{1}{\kappa_0 + \delta_0}. \quad (29)$$

Both exponential and Weibull distributions satisfy Assumption 3. In particular, for both cases, $$\lim\sup_{y\to\infty} \frac{\overline{F_k^t}(y(1+\delta_1))}{\overline{F_k^t}(y)} = 0 \text{ for any } \delta_1 > 0.$$

On the other hand, Assumption 3 does not hold for Pareto distribution.

Proposition 10. If Assumption 3 holds, $$\phi_k^{t,T_k}(\epsilon)/\phi_k^t(\epsilon) \to 1 \text{ as } \epsilon \to 0 \text{ for each } 0 \leq k \leq K, 0 \leq t \leq T. \quad (30)$$

This may be proven as follows. By Assumption 3, for any $\delta > 0$, there exists $y_0 > 0$ such that for any $y \geq y_0$, $$\frac{\overline{F_k^{t,T_k}}(y(1+\delta))}{\overline{F_k^t}(y(1+\delta))} \leq \kappa_0 + \delta_0/2,$$

and $$\frac{\overline{F_k^t}(y(1+\delta))}{\overline{F_k^t}(y)} \leq \frac{1}{\kappa_0 + \delta_0/2}.$$

Therefore, for any $y \geq y_0$, $$\overline{F_k^{t,T_k}}(y(1+\delta)) \leq \overline{F_k^t}(y). \quad (31)$$

Now, let $\epsilon_0 = \overline{F_k^t}(y_0)$, then for any $\epsilon < \epsilon_0$, $\phi_{k,t}(\epsilon) \geq y_0$. Hence $$\overline{F_k^{t,T_k}}(\phi_{k,t}(\epsilon)(1+\delta)) \leq \overline{F_k^t}(\phi_{k,t}(\epsilon)) = \epsilon. \quad (32)$$

Because the tail distribution function is monotone and $$\overline{F_k^{t,T_k}}(\phi_{k,t}^T(\epsilon)) = \epsilon,$$

we then have $$\phi_{k,t}^T(\epsilon) \leq \phi_{k,t}(\epsilon)(1+\delta). \quad (33)$$

Hence, the result follows.

It is straightforward to see that Proposition 10 implies that for each t, $c^{*t}/c_*^t \to 1$ as $\epsilon_k \to 0$ for all k. This leads to the following asymptotic result.

Theorem 11. If Assumption (1-3) hold, then the solutions obtained by (20) and (23) are asymptotic optimal in the sense that for each t, $c^{*t} = c_*^t \to 1$ as $\epsilon_k \to 0$ for all k.

In fact, for the above theorem to hold, it does not require that $\epsilon_k$ go to 0 for all k. Instead, it only requires the minimum $\epsilon_k$ to go to 0, which is stated as follows.

Corollary 12. If Assumption (2-3) hold and for any $0 \leq y \leq \infty$ there exists $\delta > 0$ such that $F_k^t(y) \geq \delta$, then the solution obtained by (23) is asymptotic optimal in the sense that $\epsilon_0 \to 0$ where $\epsilon_0 = \min_k \epsilon_k$.

This may be proven as follows. For each tier t, we define $$\overline{k}_t = \arg\max_k \phi_k^{t,T_k}(\epsilon_k)/U_k$$

and $$\underline{k}_t = \arg\max_k \phi_k^t(\epsilon_k)/U_k.$$

Moreover, let $$C_{k,t}(\epsilon) = \phi_k^{t,T_k}(\epsilon)/\phi_k^t(\epsilon)$$

and $$C_t = \max\{C_{\overline{k}_t,t}(\epsilon_{\overline{k}_t}), C_{\underline{k}_t,t}(\epsilon_{\underline{k}_t})\},$$

then $$c^{*t}/c_*^t \leq C_t.$$

From Proposition 10, it suffices to show that $\epsilon_{\overline{k}_t} \to 0$ and $\epsilon_{\underline{k}_t} \to 0$ for each t as $\epsilon_0 \to 0$. Let $\kappa = \max_k U_k / \min_k U_k$. For any $\delta > 0$, set $y_1 = \max_{k,t} \phi_k^t(\delta)$, and $\epsilon_1 = \min_{k,t} \overline{F_k^t}(\kappa y_1) > 0$. Now, we first show that for any $\{\epsilon_k : 1 \leq k \leq K\}$, if $\epsilon_0 \leq \epsilon_1$ then $\epsilon_{\underline{k}_t} \leq \delta$. Let $k_0 = \arg\min_k \epsilon_k$, then $\phi_{k_0,t}(\epsilon_0) \geq \phi_{k_0}^t(\epsilon_1) \geq \kappa y_1$. On the other hand, by the definition of $\underline{k}_t$, $$\phi_{\underline{k}_t}^t(\epsilon_{\underline{k}_t})/U_{\underline{k}_t} \geq \phi_{k_0}^t(\epsilon_0)/U_{k_0}.$$

Therefore, $$\phi_{\underline{k}_t}^t(\epsilon_{\underline{k}_t}) \geq \phi_{k_0}^t(\epsilon_0)/\kappa \geq y_1 \geq \phi_{\underline{k}_t}^t(\delta),$$

which implies $\epsilon_{\underline{k}_t} \leq \delta$. One can similarly verify that $\epsilon_{\overline{k}_t} \leq \delta$.

Remark 13. Pareto distribution does not satisfy the Assumption 3, and the asymptotic results do not hold. However, the ratio of the bounds obtained in the previous sections is bounded by a constant factor as $\epsilon_0$ goes to zero. For $\overline{F_k^t}(y) = y^{-a_k^t}$, $0 < a_k^t \leq 2$, $c^{*t}/c_*^t$ bounded by $2^{1/a}$; where $a = \min_{k,t} a_k^t$.

4.4. Example: Exponential Case

We consider the case for which the response time at each tier $R_k^t$ is exponential distributed, that is, $\overline{F_k^t}(y) = e^{-y/m_k^t}$. For this case, denote $\gamma_n(\epsilon)$ to be the inverse of the Gamma tail distribution function with parameter (n, 1), then $\phi_k^t(\epsilon) = m_k^t \gamma_1(\epsilon)$ and $\gamma_k^{t,\tau}(\epsilon) = m_k^t \gamma_\tau(\epsilon)$. Then $$c^{*t} = q^t + \max_{k \in K_t}(v_k^t \gamma T_k(\varepsilon_k)) \quad (34)$$

is a feasible solution to problem (T) and $\Sigma_t f_t(c^{*t})$ is an upper bound on the optimal solution of (T). Similarly, the solution $$c_*^t = q^t + \max_{k \in K_t}(v_k^t \gamma_1(\varepsilon_k)) \quad (35)$$

with objective value $\Sigma_t f_t(c_*^t)$ gives a lower bound for problem (T). For this case, $$c^{*t}/c_*^t \leq \max_{k \in K_t} \gamma T_k(\varepsilon_k)\gamma_1(\varepsilon_k).$$

That is, the optimality ratio is bounded by a constant depending only on T and $\epsilon$. This leads to the following theorem.

Theorem 14. If the response times $\{R_k^t, 1 \leq t \leq T\}$ are independent and identically distributed exponential random variables for each class, then (34) and (35) are two solutions which provide an upper bound and a lower bound respectively. Moreover, the optimality ratio is bounded by $\max_k \gamma T(\epsilon_k)/\gamma_1(\epsilon_k)$, which is a constant depending only on T and $\epsilon$.

Because Assumptions (1-3) are satisfied for the exponential case, the asymptotic results we obtained in the previous section hold.

Corollary 15. If the response times $\{R_k^t, 1 \leq t \leq T\}$ are independent and identically distributed exponential random variables for each class, then the solution obtained by (23) is asymptotic optimal.

5. Mean and Tail Guarantees

To satisfy both constraint (1) and (2), the minimum required capacity is obtained by solving the following problem.

(C)

$$\min \sum_t g_t(x^t)$$

$$\text{s.t.} \quad E\left[\sum_t R_k^t\right] \leq \overline{U}_k, \quad k = 1, \ldots, K \quad (36)$$

$$P\left[\sum_t R_k^t > U_k\right] \leq \varepsilon_k, \quad k = 1, \ldots, K \quad (37)$$

$$x^t \geq 0, \quad t = 1, \ldots, T \quad (38)$$

Similar to Problem (T), the tail distribution constraints makes the problem difficult. If we replace those constraints as we did in section 4, assuming that Assumption 1 holds, we can obtain a feasible solution by solving the problem (C1)

$$\min \sum_t g_t(x^t)$$

$$\text{s.t.} \quad \sum_t w_k^t x^t \leq 1, \quad k = 1, \ldots, K \quad (39)$$

$$0 \leq x^t \leq 1 / \left(\max_{k \in K(t)} \min\{c : G_k^{t,T_k}(c, U_k) \geq 1 - \varepsilon_k\} - q^t\right) \quad (40)$$

$$t = 1, \ldots, T$$

or we can obtain a lower bound on the optimal solution by solving the following problem (C2)

$$\min \sum_t g_t(x^t)$$

$$\text{s.t.} \quad \sum_t w_k^t x^t \leq 1, \quad k = 1, \ldots, K \quad (41)$$

$$0 \leq x^t \leq 1 / \left(\max_{k \in K(t)} \min\{c : G_k^t(c, U_k) \geq 1 - \varepsilon_k\} - q^t\right) \quad (42)$$

$$t = 1, \ldots, T$$

Theorem 16. Under Assumption 1, the following holds.
(i) Any feasible solution to (C1) is feasible to (C);
(ii) The optimal solution to (C) is feasible to (C2), and the optimal solution to (C2) provides a lower bound for the solution to (C);

(iii) Under Assumption (2-3), the optimal solutions to (C1) and (C2) $x^*$ and $x^*$ are asymptotic optimal in the sense that $(x^*)^t = x_*^t \to 1$ for each t as $\varepsilon_k \to 0$ for all k.

This may be proven directly from Theorems 9, 8 and 11 above.

6. Numerical Results

In this section, we use numerical results to demonstrate the performance of the inventive approximation methods. We will show how close those approximation solutions compare to the optimal solution and how performances are affected by system parameters. We will also investigate the impact of the mean end-to-end delay constraints on the approximation performance. Finally, we will show through some experiments that the optimal solution obtained in Section 3 is robust.

6.1. Approximation Performance

Figure 3:
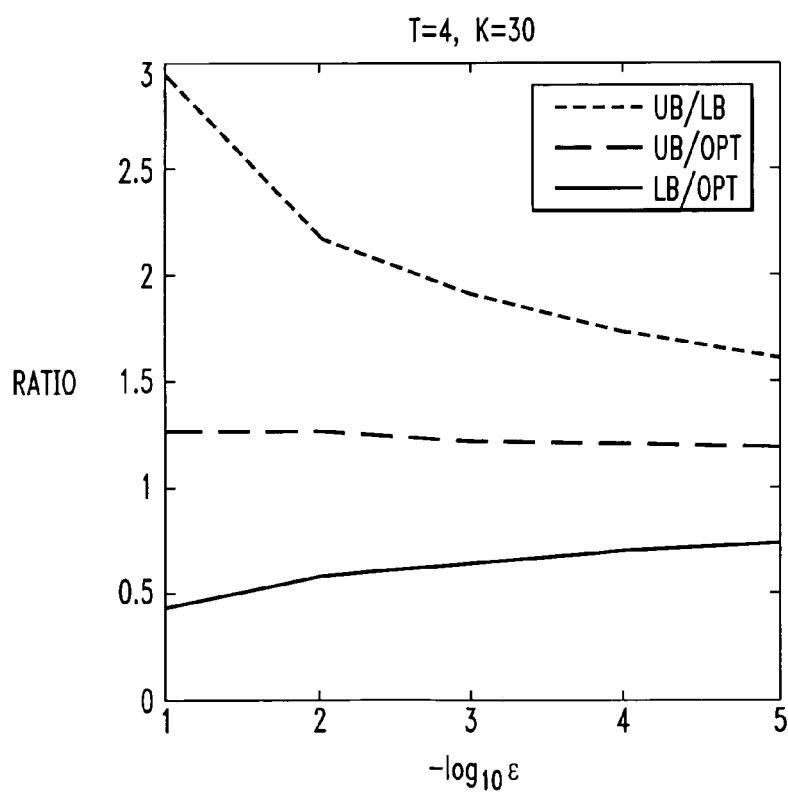
FIG. 3 is a diagram graphically illustrating approximation performance as a function of a tail distribution requirement, according to an embodiment of the present invention.
Figure 4:
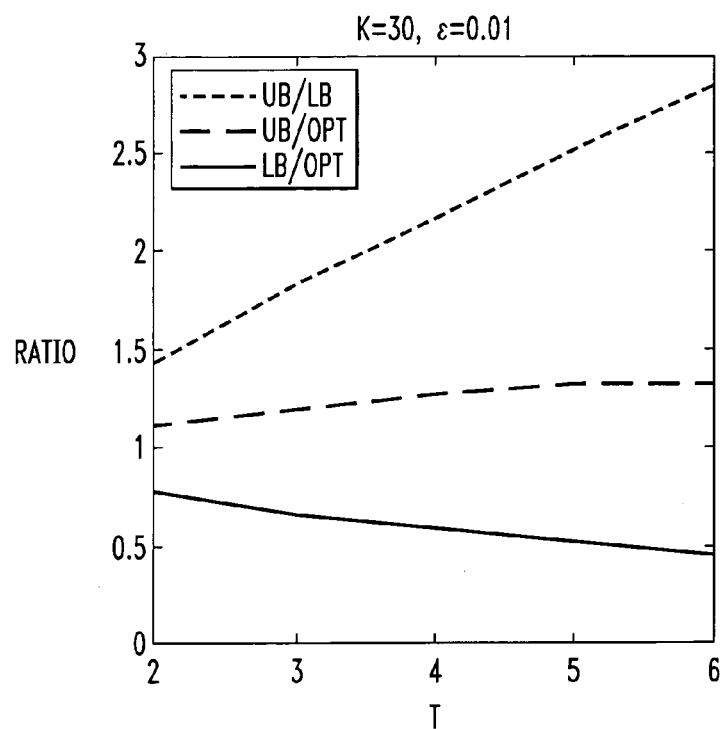
FIG. 4 is a diagram graphically illustrating approximation performance as a function of the number of tiers, according to an embodiment of the present invention.
Figure 5:
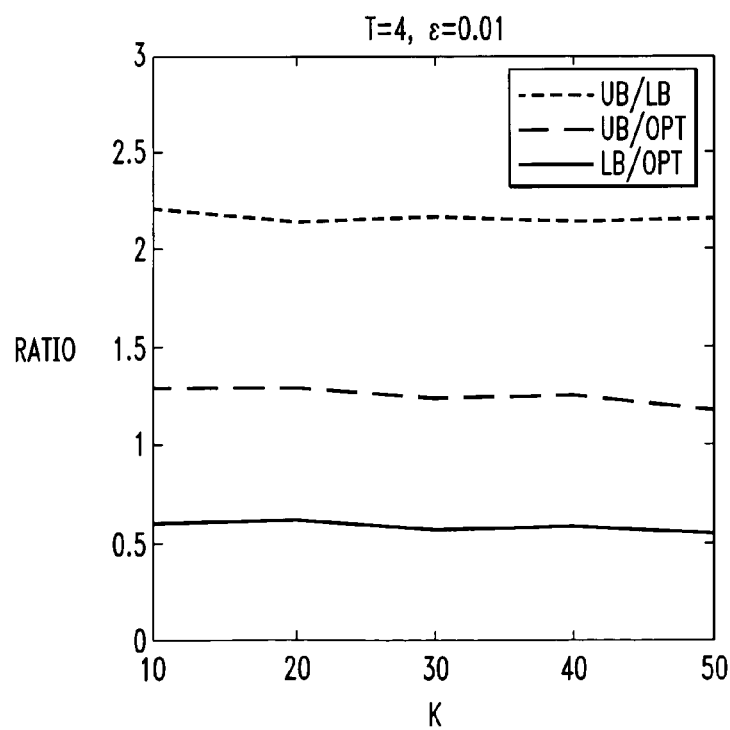
FIG. 5 is a diagram graphically illustrating approximation performance as a function of the number of classes, according to an embodiment of the present invention.

Throughout this section, we assume the response time in each tier for each class is exponential distributed, and for simplicity, all classes have the same tail distribution requirement $\varepsilon$. We first consider the systems with only end-to-end response time tail requirement but no mean delay requirement. In section 4, we presented a feasible solution to obtain the upper bound on the optimal total cost (UB) as well as a solution for the lower bound on the optimal total cost (LB). FIGS. 3, 4 and 5 respectively show how these two bounds perform for different tail distribution requirement $\varepsilon$, for different number of tiers T and for different number of classes K. Each figure consists of three curves representing the ratio of the upper bound (UB) over the optimal solution (UB ratio), the ratio of the lower bound (LB) over the optimal solution (LB ratio) and the ratio of UB over LB (optimality ratio).

From these figures, we first observe that the UB ratio is quite stable for different $\varepsilon$, T and K's which is mostly about 1.2 to 1.3. Therefore, the approximating feasible solution presented in section 4 gives a reasonable cost comparable to the possible optimal solution. The lower bound (LB) performs quite stable when the number of classes change, however, the performance degrades when the number of tiers increases or the tail distribution guarantee becomes less stringent ($\varepsilon$ increases). The ratio of UB over LB (optimality ratio) shows a decreasing trend as $\varepsilon$ or T decreases.

Imposing the mean end-to-end response time constraints besides the tail distribution constraints will reduce the ratio of UB over LB, which becomes smaller as the mean constraints becomes more stringent.

When the mean constraints are extremely stringent such that the tail distribution conditions are automatically satisfied, the ratio would equal 1. Tables 1 through 6 (FIGS. 6A through 6F) respectively report the bounds under different values of $\varepsilon$, T and K when both mean and tail constraints are present. The bounds for the cases with only tail distribution constraints are also presented for comparison. Here, the end-to-end response time threshold for the tail distribution requirement $U_k$ is set to two times the mean end-to-end response time threshold $\overline{U}_k$. We observe that adding the mean constraints increases the lower bounds quite significantly in some instances. However, when $\varepsilon$ is small, all the mean end-to-end response time constraints are automatically satisfied, and the problem reduces to the one with only tail constraints. For this case, both the upper bound and lower bound will not be affected by adding the mean end-to-end response time constraints.

6.2. Robustness

One practical concern is that the mean service time requirements $m_k^t$ are usually obtained through some measurement and prediction mechanism. Errors are very common in the measurement and predictions. Therefore, one would like to allocate the capacity in such a way that not only the total capacity is minimized but most of the end-to-end response time constraints are still satisfied when the input parameters vary slightly from the predicted ones. That is, the solution is required to be robust under data uncertainty. For simplicity, we only show the robustness results for the case where only mean end-to-end response time constraints are considered.

In section 3, we notice that the constraints on those non-bottleneck classes are less likely to be violated than the bottleneck classes when the service time requirements have some uncertainty, and the number of bottleneck classes are less than T. Therefore, when the number of tiers is small, we expect the optimal solution to the (M) problem to be quite robust. To demonstrate this fact through numerical example, we consider $\hat{w}_k^t$ is uniformly distributed in $[w_k^t(1-\Delta), w_k^t(1+\Delta)]$. Here, $\Delta$ measures how much uncertainty of the prediction on $w_k^t$. Table 4 and 5 give the average (over 100 samples) number of violated constraints under different K, T, and $\Delta$ when the true input parameters are $(\hat{w}_k^t)$ but the capacity allocated based on the optimal solution of the problem (M) with the predicted parameters $(w_k^t)$. Here, we assume the prediction of the nominal server utilization $q^t$ in each tier is accurate. The robustness of the solution is quite satisfactory because all values in Table 4 and 5 are small. This implies that if we use the solution of (M) to allocate the capacity, then only very few classes will exceed their mean end-to-end delay thresholds even if the parameter could be 25% away from what we predict.

By looking into the value of the tables along each row and/or column, we can observe how the average number of violated constraints are affected by $\Delta$, T and K. When the uncertainty level $\Delta$ or the number of tiers T increases, slightly more classes will experience unexpected long end-to-end delay. However, the total number of classes in the system K does not have much impact on the number of classes whose mean response time constraint is violated.

Table 6 gives the relative difference of the optimal objective values of the problems with input parameters $(w_k^t)$ and $(\hat{w}_k^t)$. It shows that the total cost does not change much when planning under parameter $(w_k^t)$ or $(\hat{w}_k^t)$.

7. Case Discussions Based on the Number of Nonzero $s_k$'s

We now discuss the possible cases depending on the number of nonzero $s_k$'s in the complementary slackness constraint (12). Obviously, $s_k$'s can not all be zero.

One nonzero $s_k$:

If we have exactly one nonzero $s_k$, assume $s_1 \neq 0$, and $s_2 = \ldots = s_K = 0$. Then from (11), we have $$x^t = 1/\sqrt{w_1^t s_1}, t=1,\ldots,T.$$

The complementary slackness constraint (12) leads to $$\sum_t w_1^t x^t = 1.$$

We then need to set $$s_1 = \left(\sum_t \sqrt{w_1^t}\right)^2.$$

The solution for $\vec{x}$ becomes $$x^t = \frac{1}{\sqrt{w_1^t} \sum_\tau \sqrt{w_1^\tau}}, \quad t=1,\ldots,T.$$

And the objective value is $$\sum_t \frac{1}{x^t} = \left(\sum_t \sqrt{w_1^t}\right)^2.$$

If the original problem only has one constraint, then the above formula gives the optimal solution. If there are more than one constraint in the original problem, we need to check the feasibility constraints. If the solution $\vec{x}$ satisfy the feasibility constraint (8), then it is optimal. To guarantee the feasibility constraint (8), we need $$\sum_t w_k^t x^t = \sum_t \frac{w_k^t}{\sqrt{w_1^t} \sum_\tau \sqrt{w_1^\tau}} \leq 1.$$

This is equivalent to $$\sum_t \frac{w_k^t}{\sqrt{w_1^t}} \leq \sum_t \frac{w_1^t}{\sqrt{w_1^t}} = \sum_t \sqrt{w_1^t}.$$

T nonzero $s_k$'s:

Assume we have exactly T nonzero $s_k$'s. This implies the number of classes, K, is greater than or equal to the number of tiers, T. ($K \geq T$) Let's assume $s_{k_j} \neq 0$, $j=1,\ldots,T$. Let's further assume the corresponding vectors $\{\vec{w}_{k_1}, \ldots, \vec{w}_{k_T}\}$ are linearly independent, which implies there is a unique solution $\vec{x}_0$ for the set of equations $\vec{w}_{k_j} \cdot \vec{x} = 1$, $j=1,\ldots,T$. The unique hyperplane passing through the vectors $\{\vec{w}_{k_1}, \ldots, \vec{w}_{k_T}\}$ can be represented as $\vec{x}_0 \cdot \vec{x} = 1$. This can be easily checked by plugging $\vec{w}_{k_j}$, for $j=1,\ldots,T$, as x into the equation. The intersection of this hyperplane with the t-axis is $1/x_0^t$. This intersection is obtained by assigning $x^j = 0$; $j=1,\ldots,T$, $j \neq t$, in the hyperplane equation. We observe that the sum of the intersections with all axes is exactly the objective function.

We next show that the vectors $\vec{w}_k$ corresponding to the binding constraints for any feasible $\vec{x}$ must lie on the same facet. This can be shown by contradiction.

After obtaining $x^1,\ldots,x^T$, and making sure $\vec{x} \geq 0$, we need to set K−T $s_k$'s to be zero based on the complementary slackness constraint (12). The rest T $s_k$'s can be obtained through the optimality condition (11). If all the $s_1,\ldots,s_K$ are nonnegative, then the solutions $x^1,\ldots,x^T$, and $s_1,\ldots,s_K$ are optimal.

8. Illustrative Design Systems and Methodologies

Based on the above principles, we then have the following illustrative algorithm to solve the optimization problem (M1).

Algorithm I:

Step 1:

$$w = \arg\max_{w_k: 1 \le k \le K} \sum_{t=1}^{T} \sqrt{w_k^t}.$$

Step 2: If $$\sum_{t=1}^{T} \frac{w_k^t - w^t}{\sqrt{w^t}} \le 0 \text{ for all } k = 1, \ldots, K,$$

stop. Return the optimal solution $$x^t = \frac{1}{\sqrt{w_1^t} \sum_{\tau} \sqrt{w_1^\tau}}, t = 1, \ldots, T.$$

Otherwise let $$\hat{w} = \arg\min_{w_k} \left\{ \sum_{t=1}^{T} \frac{w_k^t - w^t}{\sqrt{w^t}} : \sum_{t=1}^{T} \frac{w_k^t - w^t}{\sqrt{w^t}} > 0, 1 \le k \le K \right\},$$

and go to step 3.

Step 3: Solve $$\max_{0 < s < 1} \sum_{t=1}^{T} \sqrt{sw^t + (1-s)\hat{w}^t} \quad (43)$$

and set $w = s^* w + (1-s^*)\hat{w}$, where $s^*$ is the solution to (43).

Thus, given the detailed description of principles of the invention above, illustrative methodologies and design systems for implementing such methodologies are now described. However, it is to be understood that the invention is not limited to such illustrations.

Referring now to FIG. 7, a flow diagram illustrates a process for determining a lower bound for both mean and tail distribution guarantees in accordance with illustrative principles of the invention described above.

As shown, process 700 operates as follows.

In step 710, input parameters are obtained. For each class k, the distribution function $F_k^t$ and the mean $m_k$ of the nominal service time at tier t, the end-to-end delay service requirement ($V_k$, $U_k$, $\epsilon_k$) are obtained. For each tier t, the nominal traffic intensity $q_t$ and the capacity cost function $f_t(c)$ is obtained.

In step 720, for each k, t, the process computes $\phi_k^t = \min\{y: F_k^t(y) \ge 1 - \epsilon_k\}$.

In step 730, the process defines $g_t(x^t) = f_t(q^t + 1/x^t)$, and solves $$\min \sum_t g_t(x^t)$$

$$\text{s.t.} \sum_t m_k^t x^t / V_k \le 1, k = 1, \ldots, K$$

$$0 \le x^t \le \min\{U_k / \phi_k^t : 1 \le k \le K\}$$

Note that the above problem can be translated into the format of (M1) and then be solved using Algorithm I.

Lastly, in step 740, the optimal objective value of the above problem in step 730 then gives a lower bound to the capacity allocation problem.

Referring now to FIG. 8, a flow diagram illustrates a process for determining an upper bound for both mean and tail distribution guarantees in accordance with illustrative principles of the invention described above.

As shown, process 800 operates as follows.

In step 810, input parameters are obtained. For each class k, the distribution function $F_k^t$ and the mean $m_k$ of the nominal service time at tier t, the end-to-end delay service requirement ($V_k$, $U_k$, $\epsilon_k$) are obtained. For each tier t, the nominal traffic intensity $q_t$ and the capacity cost function $f_t(c)$ is obtained.

In step 820, for each k, t, the process derives $F_k^{t,T}$: the T-th convolution of $F_k^t$.

In step 830, for each k, t, the process computes $\phi_k^t = \min\{y: F_k^t(y) \ge 1 - \epsilon_k\}$.

In step 840, the process defines $g_t(x^t) = f_t(q^t + 1/x^t)$, and solves $$\min \sum_t g_t(x^t)$$

$$\text{s.t.} \sum_t m_k^t x^t / V_k \le 1$$

$$0 \le x^t \le \min\{U_k / \phi_k^t : 1 \le k \le K\}$$

Again, the above problem can be translated into the format of (M1) and then be solved using Algorithm I.

Lastly, in step 850, the optimal objective value of the above problem in step 840 then gives an upper bound to the capacity allocation problem. For the solution $x^t$, $1/x^t + q^t$ is a feasible capacity allocation to tier t.

Figure 9:
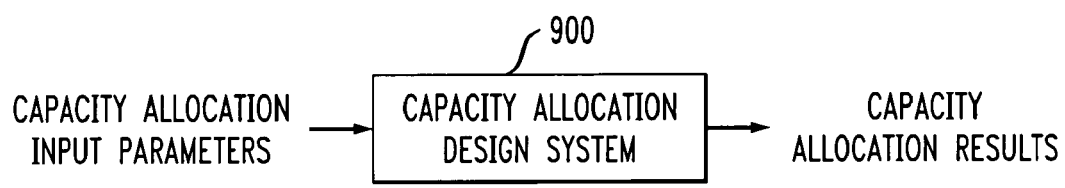
FIG. 9 is a block diagram illustrating a design system for computing capacity allocation, according to an embodiment of the present invention.

Referring now to FIG. 9, a block diagram illustrates a design system for computing capacity allocation, according to an embodiment of the present invention. In general, the design system 900 receives as input capacity allocation input parameters, e.g., as illustrated in step 710 of FIG. 7 and step 810 of FIG. 8. One or more of the capacity allocation methodologies described herein (e.g., process 700 of FIG. 7 and process 800 of FIG. 8 formulated in accordance with Algorithm I) are then employed to compute the capacity allocation results (i.e., how capacity is allocated given an input scenario so as to minimize cost and guarantee end-to-end performance).

Design system 900 may be a standalone computation system or it may be operatively connected to one or more components of a network for which it is computing results. Results computed by design system 900 may be implemented automatically and/or manually so as to realize an efficiently designed network.

Figure 10:
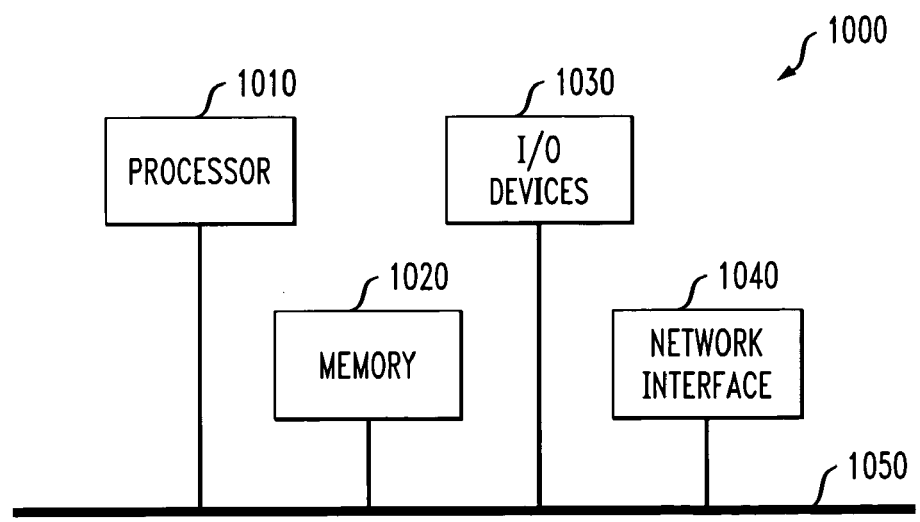
FIG. 10 is a block diagram illustrating a generalized hardware architecture of a computer system suitable for implementing a design system for computing capacity allocation, according to an embodiment of the present invention.

Referring now to FIG. 10, a block diagram illustrates a generalized hardware architecture of a computer system suitable for implementing a design system for computing capacity allocation, according to an embodiment of the present invention. More particularly, it is to be appreciated that design system 900 in FIG. 9 may implement such a computing system 1000 to perform the methodologies of the invention. Also, one or more system components (e.g., in a network being designed) may implement such a computing system 1000. Of course, it is to be understood that the invention is not limited to any particular computing system implementation.

In this illustrative implementation, a processor 1010 for implementing at least a portion of the methodologies of the invention is operatively coupled to a memory 1020, input/output (I/O) device(s) 1030 and a network interface 1040 via a bus 1050, or an alternative connection arrangement.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism for a user to provide the design inputs used by a design system of the invention to generate design results. Alternatively, the design inputs could be read into the design system from a diskette or from some other source (e.g., another computer system) connected to the computer bus 1050. Also, inputs to the design methodologies may be obtained in accordance with the one or more input devices. The output devices may be one mechanism for a user or other computer system to be presented with results of the design methodologies.

Still further, the phrase "network interface" as used herein is intended to include, for example, one or more devices capable of allowing the computing system 1000 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while the present invention has been described herein in the context of design systems, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital or analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 1010.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

As explained herein, the present invention provides advantageous solutions to a resource allocation problem in a multi-tiered environment delivering end-to-end performance guarantees. Specifically, the invention provides service guarantees on both the mean and on the tail distribution of the end-to-end response times for each class of requests. The problem was illustratively formulated as a nonlinear program to minimize a convex separable function of the capacity assignment vector. We proved structural properties and optimality conditions for the optimal solution. We also provided geometric interpretations to illustrate key parts of the problem.

Further, as explained, the problem with the requirement for the tail probability of the end-to-end response times is a challenging problem. Under suitable assumptions, we gave a constant factor bound for the solution and also showed that it is asymptotically optimal. These assumptions are quite general, and are easily satisfied by a collection of common problems. Numerical results further demonstrated the advantageous performance of the inventive methodologies.

Advantageously, the invention addresses multi-tier architectures. The invention also addresses constraints on both the average and the tail distribution of the end-to-end response times. Further, the inventive solutions are near optimal and can be obtained efficiently. The inventive solutions are robust. They are tolerant to service requirement uncertainties. Still further, the inventive solutions can be easily obtained online to adapt to the changing environment.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of designing capacity allocation for a multi-tiered computing system, each tier of the computing system having one or more computing devices, the method comprising a computer system performing the steps of:

obtaining input parameters relating to capacity allocation; and computing a capacity allocation based on at least a portion of the input parameters utilizing a nonlinear program, the capacity allocation being computable such that one or more mean delay measures and one or more tail distribution measures are satisfied for multiple service classes, wherein the step of computing the capacity allocation further comprises formulating a capacity allocation problem as an optimization problem so as to satisfy the one or more mean delay measures and the one or more tail distribution measures, and wherein the optimization problem is formulated as a separable convex programming problem with linear constraints which is solvable by finding an optimal solution on a boundary of a convex hull representing feasible solutions to the programming problem in accordance with a location of the convex hull in relation to a feasible hyperplane, such that the optimal solution represents the capacity allocation that is implemented for the computing devices of the multi-tiered computing system.

2. The method of claim 1, wherein the step of computing the capacity allocation further comprises substantially minimizing a cost function.

3. The method of claim 1, wherein the solving step further comprises solving the separable convex programming problem in polynomial time.

4. Apparatus for designing capacity allocation for a multi-tiered computing system, each tier of the computing system having one or more computing devices, the apparatus comprising:

a memory; and at least one processor coupled to the memory and operative to: (i) obtain input parameters relating to capacity allocation; and (ii) compute a capacity allocation based on at least a portion of the input parameters utilizing a nonlinear program, the capacity allocation being computable such that one or more mean delay measures and one or more tail distribution measures are satisfied for multiple service classes, wherein the step of computing the capacity allocation further comprises formulating a capacity allocation problem as an optimization problem so as to satisfy the one or more mean delay measures and the one or more tail distribution measures, and wherein the optimization problem is formulated as a separable convex programming problem with linear constraints which is solvable by finding an optimal solution on a boundary of a convex hull representing feasible solutions to the programming problem in accordance with a location of the convex hull in relation to a feasible hyperplane, such that the optimal solution represents the capacity allocation that is implemented for the computing devices of the multi-tiered computing system.

5. The apparatus of claim 4, wherein the operation of computing the capacity allocation further comprises substantially minimizing a cost function.

6. The apparatus of claim 4, wherein the solving operation further comprises solving the separable convex programming problem in polynomial time.

7. An article of manufacture for designing capacity allocation for a multi-tiered computing system, each tier of the computing system having one or more computing devices, the article of manufacture comprising a computer readable storage medium containing one or more programs which when executed by a computer system perform the steps of:

obtaining input parameters relating to capacity allocation; and computing a capacity allocation based on at least a portion of the input parameters utilizing a nonlinear program, the capacity allocation being computable such that one or more mean delay measures and one or more tail distribution measures are satisfied for multiple service classes, wherein the step of computing the capacity allocation further comprises formulating a capacity allocation problem as an optimization problem so as to satisfy the one or more mean delay measures and the one or more tail distribution measures, and wherein the optimization problem is formulated as a separable convex programming problem with linear constraints which is solvable by finding an optimal solution on a boundary of a convex hull representing feasible solutions to the programming problem in accordance with a location of the convex hull in relation to a feasible hyperplane, such that the optimal solution represents the capacity allocation that is implemented for the computing devices of the multi-tiered computing system.

8. The article of claim 7, wherein the step of computing the capacity allocation further comprises substantially minimizing a cost function.

* * * * *

UNITED STATES PATENT AND TRADEMARK OFFICE
CERTIFICATE OF CORRECTION

| | |
|---|---|
| PATENT NO. | : 7,626,917 B2 |
| APPLICATION NO. | : 10/865064 |
| DATED | : December 1, 2009 |
| INVENTOR(S) | : Lin et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 922 days.

Signed and Sealed this

Second Day of November, 2010

David J. Kappos
*Director of the United States Patent and Trademark Office*